(12) United States Patent
Kim (10) Patent No.: US 10,817,405 B2
(45) Date of Patent: Oct. 27, 2020

(54) STORAGE DEVICE AND DEBUGGING SYSTEM THEREOF

(71) Applicant: Samsung Electronics Co., Ltd., Suwon-si, Gyeonggi-do (KR)

(72) Inventor: Hee Jong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 16/103,179

(22) Filed: Aug. 14, 2018

(65) Prior Publication Data
US 2019/0227907 A1 Jul. 25, 2019

(30) Foreign Application Priority Data
Jan. 19, 2018 (KR) ........................ 10-2018-0007002

(51) Int. Cl.
| | | |
|---|---|---|
| G06F 11/00 | (2006.01) | |
| G06F 11/36 | (2006.01) | |
| G06F 11/30 | (2006.01) | |
| G06F 11/22 | (2006.01) | |
| G06F 11/273 | (2006.01) | |
| G06F 12/02 | (2006.01) | |

(52) U.S. Cl.
CPC ...... *G06F 11/3656* (2013.01); *G06F 11/2205* (2013.01); *G06F 11/2221* (2013.01); *G06F 11/273* (2013.01); *G06F 11/3034* (2013.01); *G06F 11/3062* (2013.01); *G06F 12/0238* (2013.01)

(58) Field of Classification Search
CPC .......................... G06F 11/3656; G06F 12/0238
See application file for complete search history.

(56) References Cited

U.S. PATENT DOCUMENTS

| | | | |
|---|---|---|---|
| 8,856,744 B2 | 10/2014 | Overby | |
| 8,880,779 B2 | 11/2014 | Fai et al. | |
| 8,954,629 B2 | 2/2015 | Chuang | |
| 9,419,376 B1* | 8/2016 | Blum | H01R 13/6205 |
| 9,424,153 B2* | 8/2016 | Cho | G06F 11/263 |
| 10,089,212 B2* | 10/2018 | Iwai | G06F 11/3656 |
| 10,254,338 B2* | 4/2019 | Grossier | G06F 11/3648 |
| 2006/0143539 A1 | 6/2006 | Chun et al. | |
| 2016/0070486 A1* | 3/2016 | Anderson | G06F 11/0778 |
| | | | 711/103 |

(Continued)

FOREIGN PATENT DOCUMENTS

| | | |
|---|---|---|
| KR | 0623279 | 9/2006 |
| KR | 20160059567 | 5/2016 |
| KR | 1771910 | 8/2017 |

OTHER PUBLICATIONS

PCI Express, Wikipedia (Year: 2017).*

*Primary Examiner* — Jonathan D Gibson
(74) *Attorney, Agent, or Firm* — Sughrue Mion, PLLC (57) ABSTRACT

A storage device includes a nonvolatile memory, a controller configured to control writing of data to the nonvolatile memory and reading of data from the nonvolatile memory in response to a request from a host, and a power module configured to receive power from the host. The controller is configured to transmit debugging data to the host through a channel connected to the host. The controller may be configured to transmit the debugging data to the host via at least one power line that is configurable for provision of power to the storage device.

18 Claims, 6 Drawing Sheets

(56) References Cited

U.S. PATENT DOCUMENTS

2016/0140007 A1\* 5/2016 Cho .................... G06F 11/2205
          714/42
2016/0170824 A1   6/2016 Hamo
2016/0292057 A1   10/2016 Segger
2017/0024266 A1\* 1/2017 Iwai .................... G06F 11/3656
2017/0176523 A1   6/2017 Menon et al.
2017/0315175 A1\* 11/2017 Grossier ............. G06F 11/3636
2018/0217915 A1\* 8/2018 Wang .................. G06F 9/545

\* cited by examiner

| Name | Description |
|---|---|
| P1 | TDI (Data Input) |
| P2 | TDO (Data Output) |
| P3 | DevSleep/PowerDisable |
| P4 | Ground |
| P5 | Ground |
| P6 | Ground |
| P7 | 5V Power |
| P8 | 5V Power |
| P9 | 5V Power |
| P10 | Ground |
| P11 | Device Activity Signal |
| P12 | Ground |
| P13 | TCK (Clock) |
| P14 | TMS (Mode) |
| P15 | TRST (Reset) |

(Power Segment)

FIG. 4B

| Name | Description |
|---|---|
| P1 | Retired |
| P2 | Retired |
| P3 | DevSleep/PowerDisable |
| P4 | Ground |
| P5 | Ground |
| P6 | Ground |
| P7 | 5V Power |
| P8 | 5V Power |
| P9 | 5V Power |
| P10 | Ground |
| P11 | Device Activity Signal |
| P12 | Ground |
| P13 | 12V Power |
| P14 | 12V Power |
| P15 | 12V Power |

(Power Segment)

| Name | Description |
|---|---|
| P1 | Vendor Specific |
| P2 | Vendor Specific |
| P3 | PowerDisable |
| P4 | Ground |
| P5 | Ground |
| P6 | Ground |
| P7 | 5V Power |
| P8 | 5V Power |
| P9 | 5V Power |
| P10 | Ground |
| P11 | Ready LED |
| P12 | Ground |
| P13 | 12V Power |
| P14 | 12V Power |
| P15 | 12V Power |

Power Segment

FIG. 5B

| Name | Description |
|---|---|
| P1 | SWCLK (Clock) |
| P2 | SWDIO (Data In/Output) |
| P3 | PowerDisable |
| P4 | Ground |
| P5 | Ground |
| P6 | Ground |
| P7 | 5V Power |
| P8 | 5V Power |
| P9 | 5V Power |
| P10 | Ground |
| P11 | Ready LED |
| P12 | Ground |
| P13 | 12V Power |
| P14 | 12V Power |
| P15 | 12V Power |

Power Segment

FIG. 6

STORAGE DEVICE AND DEBUGGING SYSTEM THEREOF

CROSS-REFERENCE TO RELATED APPLICATION(S)

This application claims benefit of priority to Korean Patent Application No. 10-2018-0007002 filed on Jan. 19, 2018 in the Korean Intellectual Property Office, the disclosure of which is incorporated herein by reference in its entirety.

BACKGROUND

1. Field

The present inventive concept relates to a storage device and a debugging system thereof.

2. Description of Related Art

A storage medium is configured to be coupled to other electronic devices to transmit data or store received data.

As technology has developed and the performance of storage media has thus increased, the operating speeds of storage media have increased, and the firmware thereof is configured such that storage media include various functions. Such increases in operating speed or functions may increase the likelihood of operational errors in a storage medium. A separate debugging technique for extracting error information may be used to detect or correct such errors. Conventional debugging methods include debugging by collecting a debugging log stored in a debugging buffer included in a storage device by a storage device, debugging by physically connecting a storage device to a debugging device through a separate port and collecting data required for analysis, and the like.

SUMMARY

An aspect of the present inventive concept is to provide a storage apparatus and a debugging system thereof, in which debugging may be easily and accurately performed.

Some embodiments of the present inventive concept provide a storage device including a nonvolatile memory, a controller configured to control writing of data to the nonvolatile memory and reading of data from the nonvolatile memory in response to a request from a host, and a power module configured to receive power from the host. The controller is configured to transmit debugging data to the host through a channel connected to the host. The controller may be configured to transmit the debugging data to the host via at least one power line that is configurable for provision of power to the storage device.

Further embodiments provide a debugging system including a storage device configured to write data in response to a write request, to output data in response to a read request and to provide debugging data and a host configured to receive the provided debugging data through a channel connecting the host to the storage device and to analyze the received debugging data. The storage device and the host may be connected via a plurality of power lines configurable for provision of power and the storage device may be configured to transmit the debugging data to the host via at least one power line of the plurality of power lines.

Still further embodiments provide a storage device including a nonvolatile memory configured to write data or output data, a controller configured to control writing of data to the nonvolatile memory or reading of data from the nonvolatile memory in response to a request from a host, a debugging port configured to provide debugging data to a debugging device, and a switch configured to selectively transmit the debugging data to the debugging device through the debugging port or to the host through a channel connected to the host responsive to the controller. The controller is may be configured to check whether the host supports debugging and to control the switch to transmit the debugging data to the host via the channel connected to the host if the host supports debugging and to control the switch to transmit the debugging data to the debugging device via the debugging port if the host does not support debugging.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
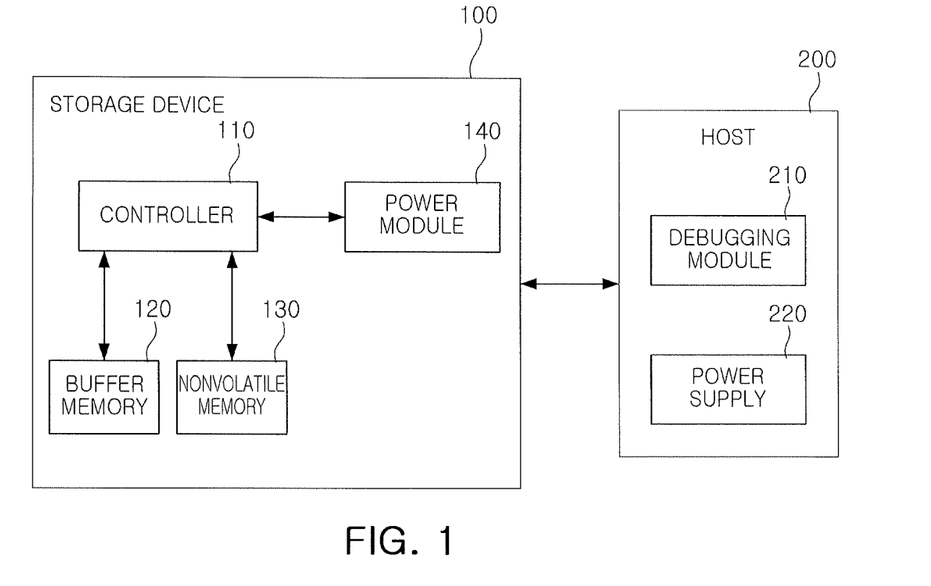
FIG. 1 is a block diagram of a debugging system according to some embodiments of the present inventive concept.

FIG. 1 is a block diagram of a debugging system according to some embodiments. Referring to FIG. 1, a debugging system according to some embodiments may include a storage device 100 and a host 200. The storage device 100 may be provided to store data or provide data according to an external request. The storage device 100 may include a controller 110, a buffer memory 120, a nonvolatile memory 130, and a power module 140.

The controller 110 may control the buffer memory 120 and the nonvolatile memory 130 in response to an external request, for example, a request from the host 200. For example, the controller 110 may write data to the nonvolatile memory 130 or read data written to the nonvolatile memory 130, at the request of the host 200.

The buffer memory 120 may temporarily store data provided by the host 200. For example, data provided, according to a write request from the host 200, may be stored in the buffer memory 120, and may then be stored in the nonvolatile memory 130. The buffer memory 120 may be implemented, for example, using a dynamic random access memory (DRAM).

The nonvolatile memory 130 may write data or output the written data under the control of the controller 110. The nonvolatile memory 130 may be implemented using, for example, nonvolatile memory devices, such as an electrically erasable and programmable ROM (EEPROM), a NAND flash memory, a NOR flash memory, a phase-change random access memory (PRAM), a resistive RAM (ReRAM), a ferroelectric RAM (FRAM), a spin-torque magnetic RAM (MRAM), and the like.

The power module 140 may receive power from the host 200, to provide power to drive the storage device 100.

The host 200 may function as a debugging unit to debug the storage device 100, and may include a debugging module 210 and a power supply 220. The debugging module 210 may collect data required for debugging of the storage device 100 from the storage device 100 and may analyze the collected data.

For example, the debugging module 210 may collect data at an arbitrary point in time or a point in time at which an error requiring analysis thereof occurs in the storage device 100, and may perform debugging, depending on one of JTAG debugging, serial-wire debugging (SWD) and UART debugging.

As described above, the debugging module 210 may collect state data of the storage device 100 at a point in time at which analysis is required, other than a debugging log, to perform debugging, thereby enabling a detailed analysis at a developer level. Further, as a separate debugging log is not required to be stored in the storage device 100, resources may be efficiently utilized. In addition, since separate logic to store the debugging log is not required, a development period may be shortened.

The power supply 220 may supply power to the storage device 100.

The storage device 100 and the host 200 may require a channel to transfer data required for debugging. In this case, the channel may be provided separately from a channel exchanging data between the storage device 100 and the host 200, which is to collect data at a required point in time without damage.

To this end, the storage device 100 may include an additional debugging port for data transfer for debugging. For example, a debugging port, such as a JTAG port, a UART port, or the like, may be provided on a printed circuit board (PCB) of the storage device 100.

However, in this case, there may be limitations in that the burden may be placed on a PCB design, a debugging device should be physically connected to the debugging port whenever debugging is performed, and on-line debugging may not be performed.

Thus, according to some embodiments, the storage device 100 and the host 200 may be configured to transmit debugging data, via a portion of a plurality of power lines.

For example, the host 200 may be directly connected to the controller 110 provided in the storage device 100, to collect data of the storage device 100 at a point in time at which analysis is required, without damage thereto.

Figure 2:
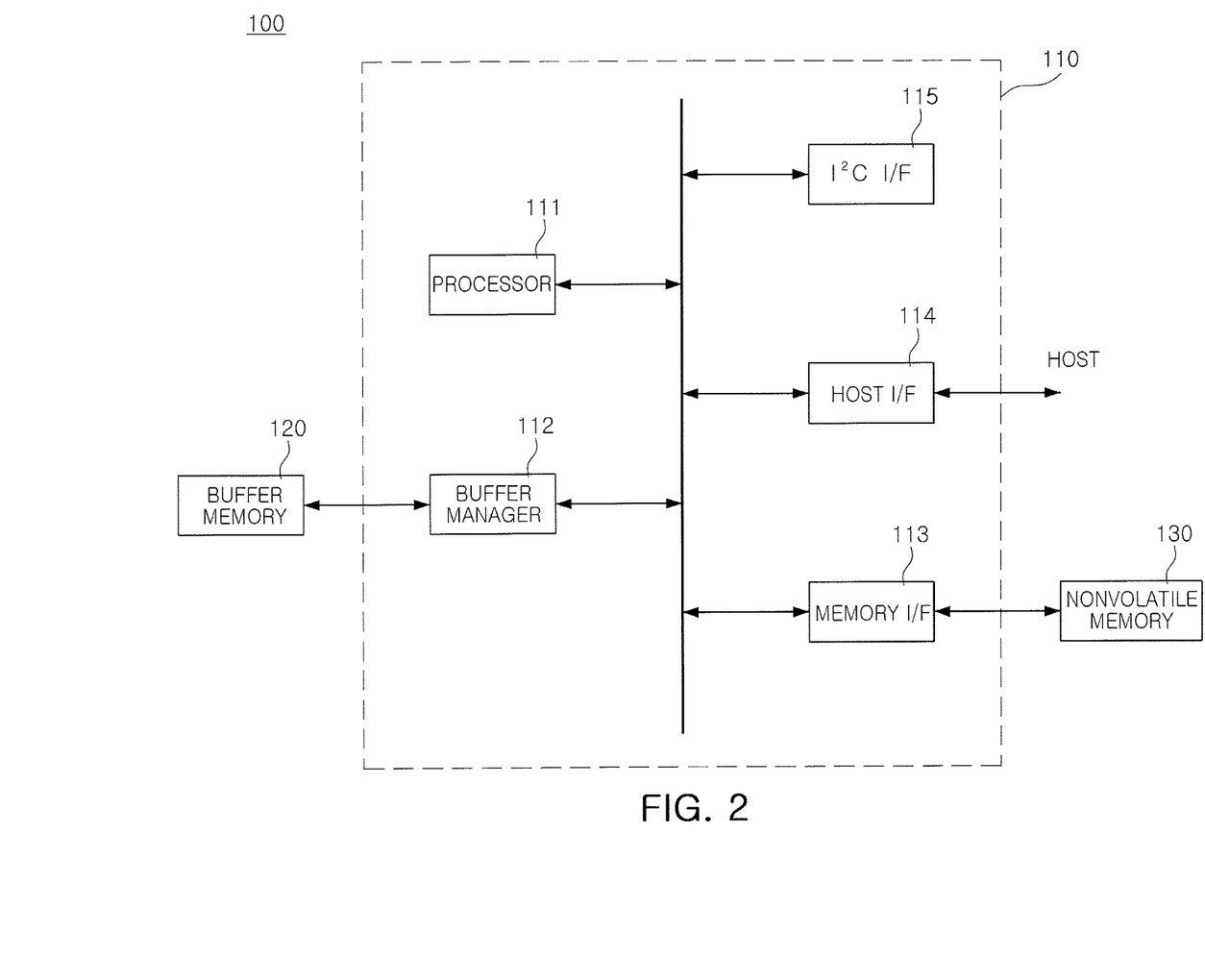
FIG. 2 is a block diagram of a storage device according to some embodiments of the present inventive concept.

FIG. 2 is a block diagram of a storage device according to some embodiments. Referring to FIG. 2, a controller 110 included in a storage device 100 according to some embodiments may include a processor 111, a buffer manager 112, a memory interface (I/F) 113, a host I/F 114, and an inter-integrated circuit ($I^2C$) I/F 115. The processor 111 may transmit control information required for a read/write operation with respect to the nonvolatile memory 130, to registers of the memory I/F 113 and the host I/F 114. The processor 111 may operate depending on firmware provided for various control operations of the controller 110. For example, the processor 111 may execute a flash translation layer (FTL) to perform garbage collection, address mapping, wear leveling, or the like, to manage the nonvolatile memory 130.

The buffer manager 112 may control the read and write operations of the buffer memory 120. For example, the buffer manager 112 may temporarily store write data and read data in the buffer memory 120.

The memory I/F 113 may exchange data with the nonvolatile memory 130. The memory I/F 113 may write the write data transferred from the buffer memory 120 to the nonvolatile memory 130. The read data provided by the nonvolatile memory 130 via a memory channel may be collected by the memory I/F 113. The read data collected in the memory I/F 113 may be stored in the buffer memory 120 by the buffer manager 112.

The host I/F 114 may perform communications with the host (see 200 of FIG. 1). For example, the host I/F 114 may provide a communications channel for communications with the host, and may, for example, provide a physical connection between the host and the storage device 100.

In other words, the host I/F 114 may provide interfacing with the storage device 100 to correspond to a bus format of the host. The bus format of the host may include, for example, at least one of a universal serial bus (USB), a small computer system interface (SCSI), a PCI express, ATA, parallel ATA, serial ATA (SATA), and a serial attached SCSI (SAS).

The $I^2C$ I/F 115 may be a bus interface capable of sharing at least one slave by a plurality of masters. The $I^2C$ I/F 115 may provide interfacing between the controller 110 and an external device. The $I^2C$ I/F 115 may be a bus interface, including one serial data line (SDA) and one serial clock line (SCL), and capable of performing bidirectional communications. In a protocol of the $I^2C$ I/F 115, a communications partner may be determined by designating a communication partner's unique address with the bus master. However, the $I^2C$ I/F 115 may be replaced with various other protocols, such as a system management bus (SMBus), a universal asynchronous receiver transmitter (UART), a serial peripheral interface (SPI), a high-speed inter-chip (HSIC), and the like.

Figure 3:
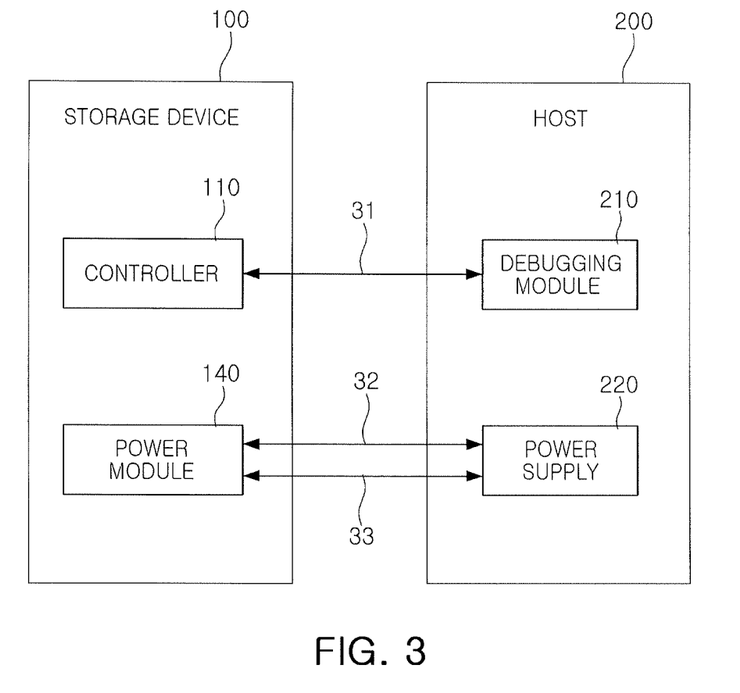
FIG. 3 is a diagram illustrating a connection between a storage device and a host according to some embodiments of the present inventive concept.

FIG. 3 is a diagram illustrating a connection between a storage device and a host according to some embodiments. With reference to FIG. 3, a storage device 100 and a host 200 may be physically connected to each other via power lines 31, 32 and 33, through which a debugging module 210 of the host 200 may collect debugging data, from a controller 110 of the storage device 100, and a power supply 220 of the host 200 may provide power to a power module 140 of the storage device 100. The power line 31, connecting the controller 110 and the debugging module 210 to each other, may be a power line not used, among the power lines provided with the storage device 100, to perform power supply or other functions. For example, in the case of a storage device using a SATA protocol, a total of 5 power lines, including two 3.3V lines and three 12V lines, may not be used. Further, in the case of a storage device using an SAS protocol, two 3.3V lines may not be used. As described above, the storage device 100 may be configured to transmit debugging data, using the power line not used in the storage device 100, such that the debugging data may be transmitted, without a separate debugging port in the storage device 100.

Figure 4A:
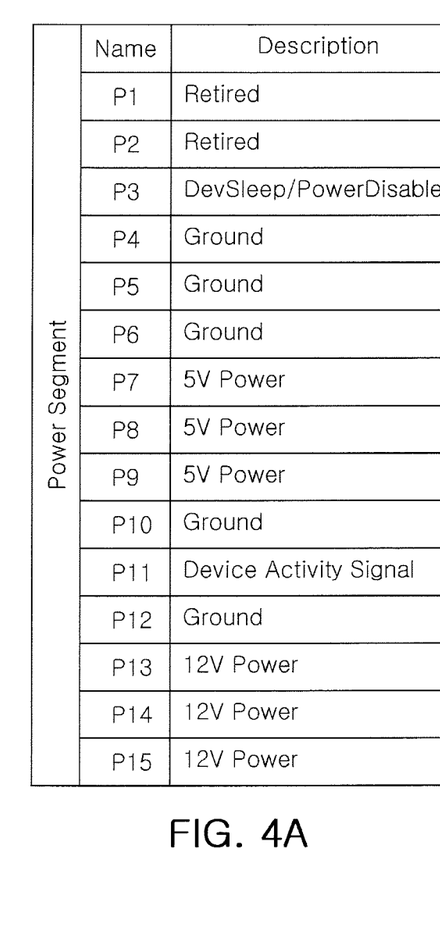
FIGS. 4A and 4B are diagrams illustrating examples of use of ports, applied to a storage device based on a SATA protocol, according to some embodiments of the present inventive concept.
Figure 4B:
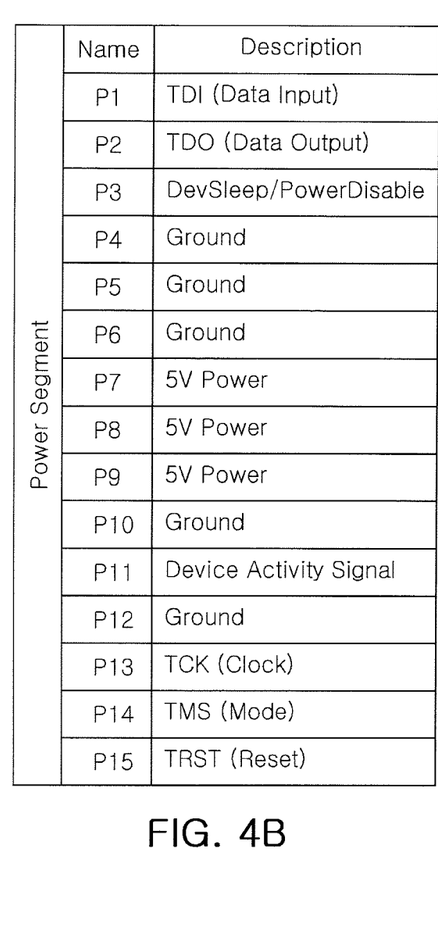

FIGS. 4A and 4B are diagrams illustrating examples of the use of ports applied to a storage device based on a SATA protocol. In detail, FIG. 4A illustrates the use of ports according to the related art, and FIG. 4B illustrates the use of ports according to some embodiments of the present inventive concept.

According to the related art, as illustrated in FIG. 4A, a host may have fifteen ports, of which ports P1 and P2, and ports P13, P14 and P15 connected to a 12V line, are not used. According to some embodiments of the present inventive concept, as illustrated in FIG. 4B, ports P1 and P2 may be used for data input (TDI) and data output (TDO), respectively, and ports P13, P14 and P15 connected to a 12V line may be used for a clock TCK, mode information TMS and a reset signal TRST, respectively. In this case, JTAG debugging may be performed.

Figure 5A:
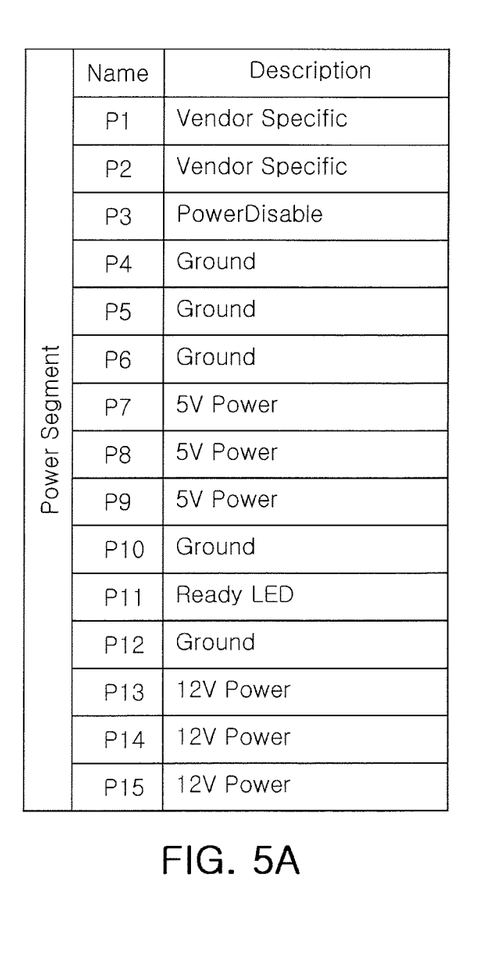
FIGS. 5A and 5B are diagrams illustrating examples of use of ports, applied to a storage device based on an SAS protocol according to some embodiments of the present inventive concept.
Figure 5B:
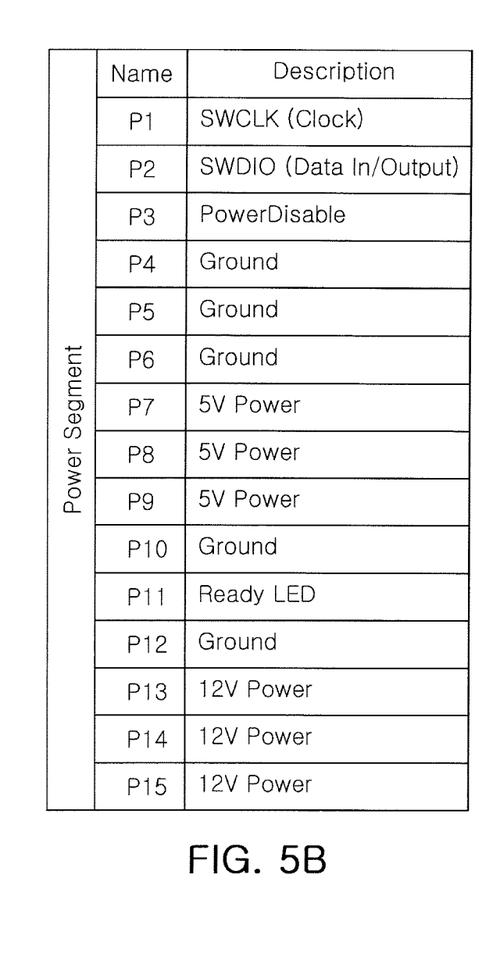

FIGS. 5A and 5B are diagrams illustrating examples of use of ports applied to a storage device based on an SAS protocol. In detail, FIG. 5A illustrates the use of ports according to the related art, and FIG. 5B illustrates the use of ports according to some embodiments of the present inventive concept. According to the related art, as illustrated in FIG. 5A, a host may have fifteen ports, of which ports P1 and P2 are not used. According to some embodiments of the present inventive concept, as illustrated in FIG. 5B, ports P1 and P2 may be used for clock SWCLK and data input/output SWDIO, respectively. In this case, serial-wire debugging (SWD) or UART debugging may be performed.

Although the example embodiments described above illustrates the cases applied to the storage devices based on a SATA protocol or an SAS protocol, example embodiments thereof are not necessarily limited thereto. For example, the example embodiments thereof may be applied to storage devices based on various protocols, such as a PCIe protocol and the like.

Figure 6:
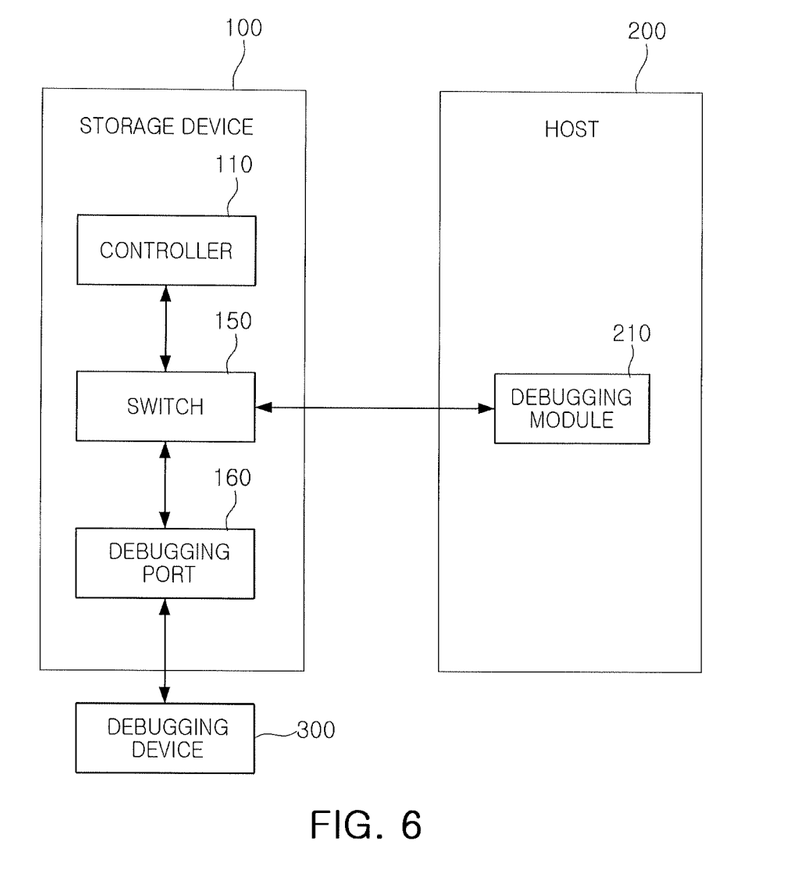
FIG. 6 is a block diagram of a debugging system according to another example embodiment of the present inventive concept.

FIG. 6 is a block diagram of a debugging system according to further example embodiments. Referring to FIG. 6, a debugging system may be configured in such a manner that a storage device 100 further includes a switch 150 and a debugging port 160. The debugging port 160 may be an additional port provided to collect debugging data from the storage device 100, and for example, may be implemented by a JTAG port, a UART port or the like provided on the PCB of the storage device 100.

A debugging device 300 may be physically connected to the debugging port 160, and the debugging device 300 may collect debugging data through the debugging port 160. The switch 150 may switch an output path through which the debugging data from a controller 110 is output, and may perform switching to selectively transmit debugging data to the debugging device 300 or a debugging module 210 provided in a host 200. For example, when the storage device 100 is turned on, the controller 110 may determine whether the host 200 supports debugging performed by the debugging module 210, and may perform switching, such that the switch 150 may transmit the debugging data to the debugging device 300 or the debugging module 210 depending on determination results.

In the debugging system illustrated in FIG. 6, for example, in a case in which the host 200 does not include the debugging module 210 for debugging, debugging may also be performed through the debugging device 300. Thus, even when the storage device 100 is connected to a host to which some embodiments of the present inventive concept is not applied, debugging may be performed without using a debugging buffer. As set forth above, according to some embodiments, a storage device and a debugging system thereof, in which debugging may be easily and accurately performed with a simple configuration.

While example embodiments have been shown and described above, it will be apparent to those skilled in the art that modifications and variations could be made without departing from the scope of the present inventive concept as defined by the appended claims.

What is claimed is:

1. A storage device comprising:
   a nonvolatile memory;
   a controller configured to control writing of data to the nonvolatile memory and reading of data from the nonvolatile memory in response to a request from a host; and
   a power module configured to receive power from the host,
   wherein the controller is configured to transmit debugging data to the host through a first channel connected to the host that is provided separately from a second channel through which the request is received from the host, and
   wherein the first channel comprises at least one power line that is configurable for provision of power to the storage device, and the controller is configured to transmit the debugging data to the host via the at least one power line.

2. The storage device of claim 1, wherein the at least one power line is not used to supply power.

3. The storage device of claim 1, wherein when the storage device is configured to support a SATA protocol, and wherein the at least one power line comprises respective power lines configured for data input, for data output, for transmission of a clock signal, for transmission of mode information and for transmission of a reset signal.

4. The storage device of claim 1, wherein when the storage device is configured to support an SAS protocol and wherein the at least one power line comprises respective power lines configured for transmission of a clock signal and for data communication.

5. A debugging system comprising:
   a storage device configured to write data in response to a write request, to output data in response to a read request and to provide debugging data; and
   a host configured to receive the debugging data through a first channel connecting the host to the storage device, to transmit the write request or the read request through a second channel that is separate from the first channel, and to analyze the debugging data,
   wherein the first channel comprises at least one power line that is configurable for provision of power to the storage device, and the storage device is configured to provide the debugging data to the host via the at least one power line.

6. The debugging system of claim 5, wherein the at least one power line comprises a plurality of power lines and wherein the first channel comprises the plurality of power lines and the storage device is configured to transmit the debugging data to the host via one of the plurality of power lines.

7. The debugging system of claim 6, wherein the one of the plurality of power lines is not configured to supply power.

8. The debugging system of claim 6, wherein when the storage device is configured to support a SATA protocol and wherein respective ones of the plurality of power lines are configured for data input, for data output, for transmission of clock signal, for transmission of mode information and for transmission of a reset signal.

9. The debugging system of claim 6, wherein when the storage device is configured to support an SAS protocol and wherein respective ones of the plurality of power lines are configured for transmission of a clock signal and for data communication.

10. The debugging system of claim 5, wherein the storage device is configurable to support a SATA protocol, an SAS protocol, and a PCIe protocol.

11. The debugging system of claim 5, wherein the host comprises:
   a debugging module configured to analyze the debugging data; and
   a power supply configured to supply power to the storage device.

12. The debugging system of claim 11, wherein the debugging module is configured to perform at least one of JTAG debugging, serial-wire debug (SWD) debugging and UART debugging.

13. A storage device comprising:
   a nonvolatile memory configured to write data or output data;
   a controller configured to control writing of data to the nonvolatile memory or reading of data from the nonvolatile memory in response to a request from a host;
   a debugging port configured to provide debugging data to a debugging device; and
   a switch configured to selectively transmit the debugging data to the debugging device through the debugging port or to the host through a channel connected to the host responsive to the controller,
   wherein the storage device and the host are connected via a plurality of power lines that are configurable to support provision of power and wherein the controller is configured to transmit the debugging data to the host via at least one power line of the plurality of power lines.

14. The storage device of claim 13, wherein the controller is configured to check whether the host supports debugging and to control the switch to transmit the debugging data to the host via the channel connected to the host if the host supports debugging.

15. The storage device of claim 13, wherein the controller is configured to check whether the host supports debugging and to control the switch to transmit the debugging data to the debugging device via the debugging port if the host does not support debugging.

16. The storage device of claim 13, wherein the at least one power line is not configured to supply power.

17. The storage device of claim 13, wherein the storage device is configured to support a SATA protocol and wherein respective ones of the plurality of power lines are configured for data input, for data output, for transmission of a clock signal, for transmission of mode information and for transmission of a reset signal.

18. The storage device of claim 13, wherein when the storage device is configured to support an SAS protocol and wherein respective ones of the plurality of power lines are configured for transmission of a clock signal and for data communication.

* * * * *